United States Patent
Zhou et al.

(10) Patent No.: US 10,019,492 B2
(45) Date of Patent: Jul. 10, 2018

(54) STOP WORD IDENTIFICATION METHOD AND APPARATUS

(71) Applicant: HUAWEI TECHNOLOGIES CO., LTD., Shenzhen, Guangdong (CN)

(72) Inventors: Wenli Zhou, Xi'an (CN); Zhe Wang, Xi'an (CN); Feiran Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/693,971

(22) Filed: Sep. 1, 2017

(65) Prior Publication Data

US 2018/0004815 A1    Jan. 4, 2018

Related U.S. Application Data (63) Continuation of application No. PCT/CN2015/096179, filed on Dec. 1, 2015.

(51) Int. Cl.
*G06F 17/30* (2006.01)
*G06N 99/00* (2010.01)

(52) U.S. Cl.
CPC .. *G06F 17/30536* (2013.01); *G06F 17/30483* (2013.01); *G06N 99/005* (2013.01)

(58) Field of Classification Search
None
See application file for complete search history.

(56) References Cited

U.S. PATENT DOCUMENTS

| 6,252,988 B1 * | 6/2001 | Ho ....................... G06K 9/6256 382/161 |
| 7,124,947 B2 * | 10/2006 | Storch ....................... G07F 1/06 235/462.01 |
| 7,945,579 B1 | 5/2011 | Tong et al. |
| 8,131,735 B2 * | 3/2012 | Rose ................. G06F 17/30616 704/4 |

(Continued)

FOREIGN PATENT DOCUMENTS

| CN | 102567371 A | 7/2012 |
| CN | 103455535 A | 12/2013 |

(Continued)

OTHER PUBLICATIONS

Wilbur et al, "The automatic identification of stop words", 2012.*
Lo et al, "Automatically Building a Stopword List for an Information Retrieval System", 2005.*

(Continued)

*Primary Examiner* — Hung Le
(74) *Attorney, Agent, or Firm* — Huawei Technologies Co., Ltd.

(57) ABSTRACT

The present application relates to the field of computer technologies, and in particular, to a stop word identification method used in an information retrieval system. In a stop word identification method, after a first query input by a user is acquired, a second query that belongs to a same session as the first query is acquired, and a stop word in the first query is identified according to a change-based feature of each word in the first query relative to the second query. According to the solution provided by the present application, a stop word in a query can be identified more accurately, and efficiency and precision of an information retrieval system are improved.

18 Claims, 4 Drawing Sheets

(56) References Cited

U.S. PATENT DOCUMENTS

| | | | |
|---|---|---|---|
| 8,352,469 B2* | 1/2013 | Rose | G06F 17/277 706/45 |
| 8,688,727 B1* | 4/2014 | Das | G06F 17/30528 707/748 |
| 9,009,144 B1* | 4/2015 | Li | G06F 17/30389 707/722 |
| 9,110,975 B1 | 8/2015 | Diligenti et al. | |
| 2003/0087694 A1* | 5/2003 | Storch | G07F 1/06 463/25 |
| 2006/0253427 A1* | 11/2006 | Wu | G06F 17/3064 |
| 2008/0141278 A1 | 6/2008 | Dudley et al. | |
| 2008/0189264 A1* | 8/2008 | Cochran | G06F 17/30864 |
| 2011/0004610 A1* | 1/2011 | Rose | G06F 17/277 707/759 |
| 2017/0178033 A1* | 6/2017 | Vijayaraghavan | G06N 99/005 |

FOREIGN PATENT DOCUMENTS

| | | |
|---|---|---|
| CN | 103914445 A | 7/2014 |
| JP | H11175541 A | 7/1999 |
| JP | 2001325104 | 11/2001 |

OTHER PUBLICATIONS

Fotis Lazarinis, "Engineering and Utilizing a Stopword List in Greek Web Retrieval", 2007.*

Hao et a, "Automatic Identification of Stop Words in Chinese Text Classification", 2008.*

Hassan Saif et al., "On Stopwords, Filtering and Data Sparsity for Sentiment Analysis of Twitter", LREC 2014, Ninth International Conference on Language Resources and Evaluation Proceedings., pp. 810-817, total 8 pages.

Feng Zou et al., "Automatic Construction of Chinese Stop Word List", Proceedings of the 5th WSEAS International Conference on Applied Computer Science, Hangzhou, China, Apr. 16-18, 2006, total 6 pages.

Bin Jiang, "Chinese spoken document retrieval method based on stop-word processing", Dissertation for the Master Degree in Engineering, Harbin Institute of Technology, Jun. 26, 2008, with an English abstract, total 65 pages.

Takano Atsuko et al, A Framework of the information retrieval through man-machine dialogue [in Japanese]. IEICE technical report. Natural language understanding and models of communication 100(100), 49-54, May 22, 2000, 3 pages.

* cited by examiner

STOP WORD IDENTIFICATION METHOD AND APPARATUS

CROSS-REFERENCE TO RELATED APPLICATIONS

This application is a continuation of International Application No. PCT/CN2015/096179, filed on Dec. 1, 2015, the disclosure of which is hereby incorporated by reference in its entirety.

TECHNICAL FIELD

The present invention relates to the field of computer technologies, and in particular, to a stop word identification method and apparatus that are used in an information retrieval system, and a computing device.

BACKGROUND

An information retrieval system, for example, a search engine or a question answering system retrieves, according to a query input by a user, related content required by the user. The query input by the user may include a part of words and phrases that do not have actual meanings but occur frequently. Those words and phrases are also referred to as stop words. To improve retrieval efficiency and accuracy, the information retrieval system needs to identify the stop words in the query, and remove this part of stop words from the query to obtain a keyword of the query. Then the information retrieval system performs matching according to the acquired keyword to acquire the related content required by the user.

As the information retrieval system is widely available and intelligent, more users perform searches by inputting queries in natural and semi-natural linguistic manners. Therefore, higher requirements are imposed on stop word identification capabilities of the information retrieval system. In the prior art, stop word identification is implemented mainly depending on a stop word list that is manually compiled in advance by experts in the field of words and phrases. However, manually compiling the stop word list causes high production costs; in addition, the method of identifying a stop word in an input sentence merely by matching with the stop word list also cannot adapt to increasingly complicated user search behaviors.

SUMMARY

The present application provides a stop word identification method and apparatus, and a computing device to improve stop word identification precision.

A first aspect of the present application provides a stop word identification method, where the method is executed by an information retrieval system running on a computing device and includes: receiving a first query, and acquiring a session identifier (ID) corresponding to the first query; acquiring, according to the acquired session ID, a second query that belongs to a same session as the first query; acquiring a change-based feature of each word in the first query relative to the second query, where the change-based feature is used to reflect various changes of each word in the first query relative to the second query, for example, a new word, a part-of-speech, a position of a word, and punctuation marks at both ends of a word; and identifying a stop word in the first query according to the change-based feature of each word in the first query relative to the second query.

Optionally, the second query is a previous query input by a user before the first query is input. In a process of performing a search by using the information retrieval system, change-based features between queries consecutively input by the user can better reflect query adjustments made by the user. Therefore, the change-based features between the queries that are consecutively input are helpful for identifying the stop word.

A query that belongs to a same session as a to-be-processed query is acquired, then change-based features of words in the to-be-processed query relative to the query are acquired, and the change-based features are incorporated into considerations for identifying the stop word in the to-be-processed query. Therefore, in the stop word identification process, stop word identification can be performed according to the change-based features between the queries, and stop word identification precision is improved.

With reference to the first aspect, in a first implementation manner of the first aspect, the acquired second query meets any one of the following conditions or a combination of any two or more of the following conditions: a length of a longest common clause of the first query and the second query is greater than a first threshold; or a minimum quantity of operations required for converting the first query into the second query is less than a second threshold; or the first query is mapped to a first vector, the first query is mapped to a second vector, and an included angle between the first vector and the second vector is less than a third threshold; or a ratio of a length of a longest common clause of the first query and the second query to a sum of lengths of the first query and the second query is greater than a fourth threshold; or a ratio of a length of a longest common clause of the first query and the second query to a length of a shorter one of the first query and the second query is greater than a fifth threshold; or a distance between the first vector and the second vector is less than a sixth threshold.

Multiple queries may belong to the same session as the first query. However, in the process of using the information retrieval system, the user may change a retrieval target, and there are generally great changes in used queries when the user retrieves different targets, and therefore, a better effect is achieved if the stop word is identified according to change-based features between two queries with a same or similar retrieval target. Therefore, the multiple queries belonging to the same session as the first query are further discriminated, and the second query having few differences from the first query is determined. It is more probable that the second query and the first query have a same or similar retrieval target. Then the second query is used to extract the change-based feature of each word in the first query relative to the second query.

With reference to the first aspect or the first implementation manner of the first aspect, in a second implementation manner of the first aspect, the method further includes: querying a word feature database of the information retrieval system according to each word in the first query, and acquiring a statistical feature of each word in the first query. Therefore, in the stop word identification process, the stop word in the first query is identified not only according to the change-based feature of each word in the first query relative to the second query, but also according to the statistical feature of each word in the first query.

The statistical feature of each word in the first query can also reflect a statistical parameter of each word in a corpus, and using the statistical feature for stop word identification can further improve stop word identification precision.

Optionally, a first-query-based feature of each word in the first query is further acquired, and the stop word in the first query is identified according to the statistical feature of each word in the first query, the change-based feature of each word in the first query relative to the second query, and the first-query-based feature of each word in the first query, so that stop word identification precision is further improved.

With reference to the second implementation manner of the first aspect, in a third implementation manner of the first aspect, the identifying the stop word in the first query according to the statistical feature of each word in the first query and the change-based feature of each word in the first query relative to the second query includes: inputting the change-based feature of each word in the first query relative to the second query and the statistical feature of each word in the first query to an identification model, and obtaining the stop word identified by the identification model, in the first query, where the identification model is generally a segment of program code, and when the program code runs, a stop word identification function is implemented.

With reference to the third implementation manner of the first aspect, in a fourth implementation manner of the first aspect, the method further includes: using a statistical feature of the stop word in the first query and a change-based feature of the stop word in the first query relative to the second query as a positive sample, using a statistical feature of any word except the stop word in the first query and a change-based feature of any word except the stop word in the first query relative to the second query as a negative sample, and training the identification model according to the positive sample and the negative sample.

With reference to the fourth implementation manner of the first aspect, in a fifth implementation manner of the first aspect, before the identification model is trained, the stop word identified by the identification model is removed from the first query to obtain a candidate search term, and a search is performed according to the candidate search term to obtain a search result; and the training is performed if accuracy of the search result is determined.

To determine accuracy of the search result is to analyze operation information corresponding to the first query, so as to determine user satisfaction with the search result corresponding to the first query. Stop words and non stop words identified in the stop word identification process corresponding to the query that is satisfactory to the user are selected, and various features of these stop words and non stop words are used to train the identification model to further improve identification precision of the identification model.

A second aspect of the present application provides a stop word identification apparatus, where the apparatus includes an input module and a processing module. The input module is configured to receive a first query, and acquire a session identifier ID corresponding to the first query. The processing module is configured to acquire, according to the session ID, a second query that belongs to a same session as the first query; acquire a change-based feature of each word in the first query relative to the second query, where the change-based feature is used to reflect various changes of each word in the first query relative to the second query, for example, a part-of-speech, a position of a word, and punctuation marks at both ends of a word; and identify a stop word in the first query according to the change-based feature of each word in the first query relative to the second query. The apparatus is configured to implement the stop word identification method provided by the first aspect.

A third aspect of the present application provides a computing device, including a processor and a memory. When running, the computing device can implement the stop word identification method provided by the first aspect. Program code for implementing the stop word identification method provided by the first aspect may be stored in the memory and executed by the processor.

A fourth aspect of the present application provides a storage medium. When executed, program code stored in the storage medium can implement the stop word identification method provided by the first aspect. The program code includes computer instructions for implementing the stop word identification method provided by the first aspect.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes the technical solutions in the embodiments of the present invention with reference to the accompanying drawings in the embodiments of the present invention.

Throughout the specification, the term "stop word", also referred to as a stop word, refers to a word or phrase that has no direct impact or has little impact on a sentence representation in a sentence, for example, a word or phrase in a query that is input by a user but is not helpful for searching out a related file. For example, "one" in a query "one basketball player Kobe" is not helpful for retrieving related content required by the user, and therefore, in this scenario, "one" may be considered as a stop word. It should be noted that, in different contexts or application scenarios, determinations on whether a same word or phrase is a stop word may vary. For example, in a query "one world one dream", if "one" is still removed as a stop word, accuracy of a search result is affected greatly.

Throughout the specification, the term "session" includes messages exchanged between two or more devices in a period of time. If a session is created between a user and a server, the period of time starts when the user begins to use a service, and ends when the user definitely stops using the service, or ends when the user does not interact with the server for some time, for example, 30 minutes. Specifically, in a use environment of an information retrieval system, when a new session begins, the information retrieval system generates a new session ID, and continuously receives queries sent by a user. When the information retrieval system does not receive, in a continuous period of time, any new query sent by the user, the information retrieval system considers that the current session ends. All queries received by the information retrieval system after the session begins, until the session ends, belong to the session, and the session ID and the queries belonging to the session are stored in historical queries.

Throughout the specification, the term "boundless language" refers to a language that has no punctuation mark or space for setting boundaries. Common boundless languages include Chinese, Japanese, and the like. Correspondingly, common bounded languages include English.

Figure 1:
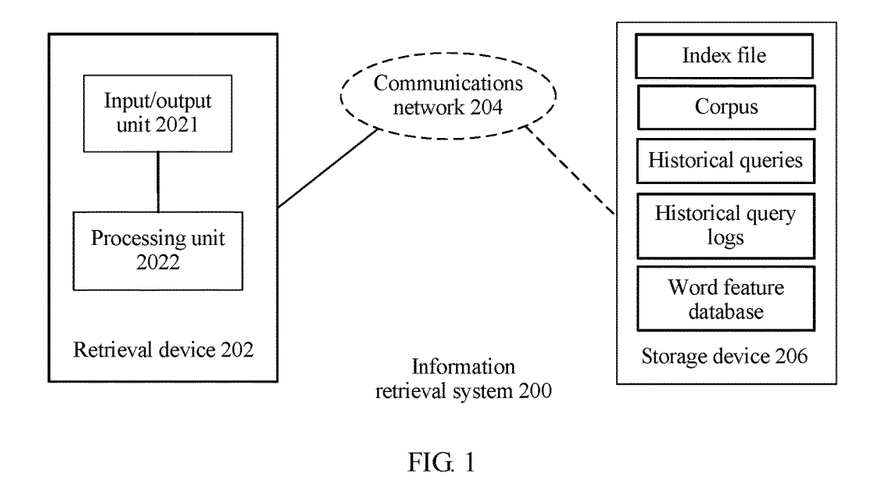
FIG. 1 is a schematic diagram of an organizational structure of an information retrieval system according to an embodiment of the present invention.

Architecture Diagram of Information Retrieval System Applied in Embodiments of the Invention FIG. 1 is an implementation manner of an information retrieval system 200, including a storage device 206 and a retrieval device 202. The storage device 206 stores data required for performing a search in the information retrieval system. The storage device 206 may establish communication with the retrieval device 202 by using a communications network 204. The storage device 206 may also be directly disposed in the retrieval device 202, and establish communication with the retrieval device 202 by using an input/output unit 2021. The retrieval device 202 includes the input/output unit 2021 and a processing unit 2022. After a user sends a query to the retrieval device 202 by using the input/output unit 2021, the retrieval device 202 performs a search according to the query, and returns corresponding search results to the user. Generally, the information retrieval system displays search results to the user by using a series of files. If the user sends the query to the retrieval device 202 by using the communications network 204, the input/output unit 2021 may be a network interface. If the user sends the query to the retrieval device 202 at the retrieval device 202 locally, the input/output unit 2021 may also be an input/output (I/O) interface of the retrieval device 202.

Figure 2:
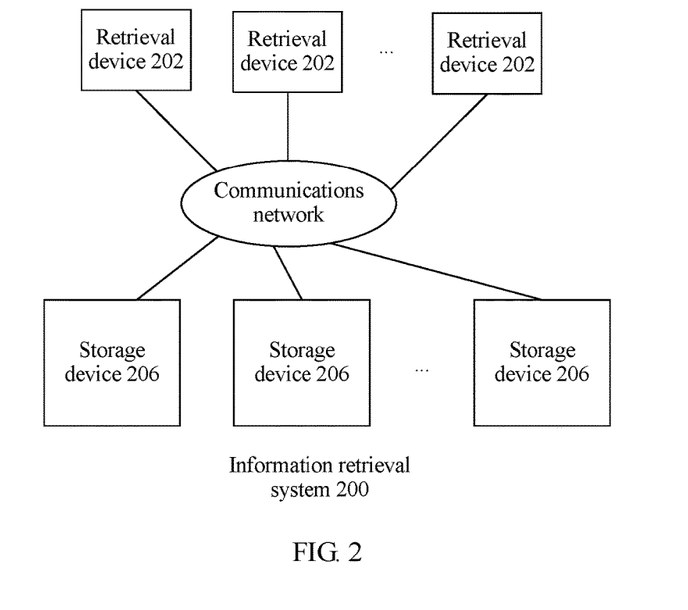
FIG. 2 is a schematic diagram of an organizational structure of another information retrieval system according to an embodiment of the present invention.

FIG. 2 is another implementation manner of the information retrieval system 200, including one or more retrieval devices 202 and further including one or more storage devices 206. Communication is implemented between each retrieval device 202 and each storage device 206 by using a communications network. Data of the information retrieval system 200, such as a corpus, an index file database, historical queries, historical query logs, and a word feature database, may be deployed in the storage devices 206 in a distributed manner. The one or more retrieval devices 202 can form a distributed computing system for processing queries. When large quantities of queries need to be processed, and there is heavy load in the information retrieval system 200, the information retrieval system 200 can allocate tasks to be processed to different retrieval devices 202 for execution, so as to improve parallel processing capabilities of the information retrieval system 200.

Generally, the information retrieval system 200 periodically updates files that can be indexed by the information retrieval system 200, and stores these files in a corpus. After acquiring updated files, the information retrieval system 200 allocates an ID to each file, and establishes an index. A common index includes an inverted index. As shown in Table 1, the inverted index records IDs of files in which each word is located, and a file recording the index is also referred to as an index file.

TABLE 1

| Word 1 | File 1 | File 6 |
| Word 2 | File 3 | File 4 |
| . . . | . . . | . . . |
| Word n | File 5 | File 9 |

After the retrieval device 202 acquires a query by using an input/output unit 2021, a processing unit 2022 segments the query into a series of words. If the query is in a boundless language, the process of acquiring a series of words is also referred to as word segmentation. For example, "手机购物" is segmented into two words, "手机" (which means a mobile phone and is pronounced as $ou(214)$ ₺ $i(55)$) and "购物" (which means shopping and is pronounced as kou(51) u(51). If the query is in English, word segmentation does not need to be performed on the query in the process of acquiring a series of words; instead, different words are distinguished according to spaces in the query. A part of the acquired series of words may be stop words. To ensure accuracy of a search result, the stop words in these words need to be identified subsequently. Then the words after the stop words are removed are matched with the index file, and a matching status of each file that matches the query, in the index file is acquired, where the matching status includes scores or an arrangement order of the matched files, and finally, a certain quantity of files having highest scores or arranged in uppermost positions are returned to a user.

It can be seen from a workflow of the information retrieval system 200 that accuracy of the search result output by the information retrieval system 200 largely depends on accuracy of words matching the index file. Therefore, accurate identification of stop words is of great importance to performance of the information retrieval system.

Figure 3:
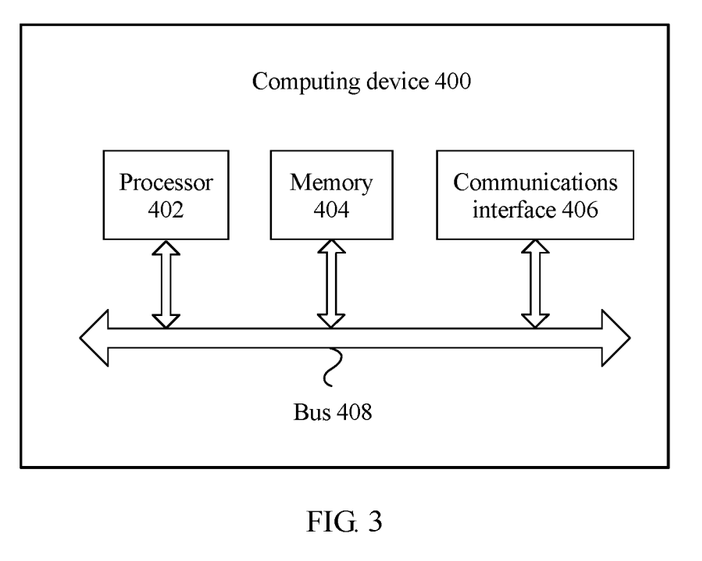
FIG. 3 is a schematic diagram of an organizational structure of a computing device according to an embodiment of the present invention.

The retrieval device 202 in FIG. 1 or FIG. 2 may be implemented by a computing device 400 in FIG. 3. A schematic diagram of an organizational structure of the computing device 400 is shown in FIG. 3. The computing device includes a processor 402 and a memory 404, and may further include a bus 408 and a communications interface 406. The communications interface 406 may be an implementation manner of the input/output unit 2021. The processor 402 and the memory 404 may be an implementation manner of the processing unit 2022.

The processor 402, the memory 404, and the communications interface 406 may implement communications connections to each other by using the bus 408, or may implement communications connections by other means such as wireless transmission.

The memory 404 may include a volatile memory, for example, a random access memory (RAMt); the memory may also include a non-volatile memory, for example, a read-only memory (ROM), a flash memory, a hard disk drive (HDD), or a solid-state drive (SSD); the memory 404 may further include a combination of the foregoing types of memories. When the computing device 400 runs, the memory 404 loads data in the storage device 206, such as the historical queries, historical query logs, and word feature database, and provides the data to the processor 402 for use. When the technical solution provided by the present invention is implemented by software, program code for implementing a stop word identification method provided by the present invention in FIG. 4 may be stored in the memory 404, and executed by the processor 402.

The computing device 400 acquires a query by using the communications interface 406, and after acquiring a search result corresponding to the query, returns the search result to a user by using the communications interface 406.

The processor 402 may be a central processing unit (CPU). After acquiring a first query, the processor 402 acquires a second query belonging to a same session as the first query, extracts a change-based feature of each word in the first query relative to the second query, where the change-based feature is used to indicate changes of each word in the first query relative to the second query, such as a position, a part-of-speech, punctuation marks at both ends, and a syntactic class, and uses the change-based feature of each word in the first query relative to the second query to identify a stop word in the first query.

A query that belongs to a same session as a to-be-processed query is acquired, then change-based features of words in the to-be-processed query relative to the query are acquired, and the change-based features are taken into considerations for identifying the stop word in the to-be-processed query. Therefore, in the stop word identification process, stop word identification can be performed according to the change-based features between the queries, and stop word identification precision is improved.

The processor 402 may acquire multiple queries that belong to the same session as the first query. However, in the process of using an information retrieval system, the user may change a retrieval target, and there are generally great changes in used queries when the user retrieves different targets, and therefore, a better effect is achieved if the stop word is identified according to change-based features between two queries with a same or similar retrieval target. Therefore, the processor 402 may further discriminate the multiple queries belonging to the same session as the first query, and determine the second query having few differences from the first query, and then use the second query to extract the change-based feature of each word in the first query relative to the second query.

The processor 402 may further acquire a statistical feature of each word in the first query, and input the statistical feature and the change-based feature of each word to an identification model to identify the stop word in the first query. The identification model used by the processor 402 may be a segment of program code, where the program code may be stored in the memory 404, and the processor 404 invokes this segment of program code when training the identification model or when using the identification model to identify the stop word. The identification model may also be implemented by hardware. In this case, the processor 402 inputs the statistical feature and change-based feature of each word in the first query to the hardware, and the dedicated hardware returns an identification result to the processor 402. The hardware may be a field-programmable logic gate array (FPGA).

The statistical feature of each word in the first query reflects statistical information about each word in the first query, in a corpus of the information retrieval system, and using the statistical feature of each word in the stop word identification process is also helpful for identifying the stop word in the first query.

Figure 4:
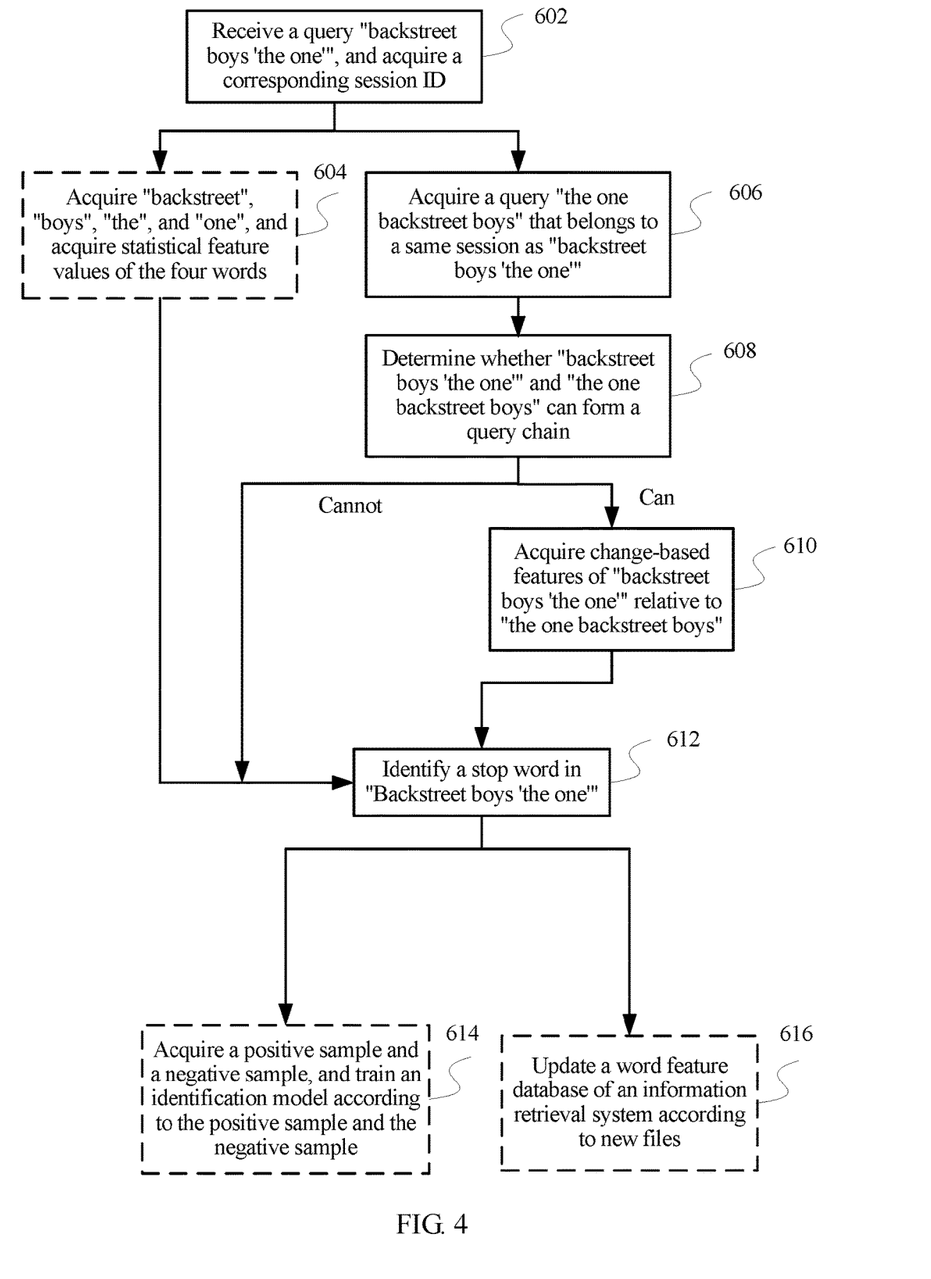
FIG. 4 is a schematic flowchart of a stop word identification method according to an embodiment of the present invention.

The present invention further provides a stop word identification method. When the retrieval device 202 in FIG. 1 and FIG. 2 and the computing device 400 in FIG. 3 run, the stop word identification method is executed. A schematic flowchart of the method is shown in FIG. 4.

Step 602: Receive a first query, and acquire a session ID corresponding to the first query.

In this embodiment, for example, the first query received by an information retrieval system is "backstreet boys 'the one'", and the session ID corresponding to "backstreet boys 'the one'" is acquired. At this time, generally, there are two cases. If the query is a first query in a new session, a session ID needs to be generated for the query in step 602. If the query belongs to an existing session, the session ID acquired in step 602 is an ID of the existing session.

Optionally, after step 602, step 604 is further performed.

Step 604: Query a word feature database of the information retrieval system according to each word in the first query, and acquire a statistical feature of each word in the first query.

First, four words, "backstreet", "boys", "the", and "one", are acquired from "backstreet boys 'the one'". If the query received in step 602 is in a boundless language, word segmentation needs to be performed on the query to acquire each word in the query. Statistical features of the four words, for example, term frequencies, an average value of term frequencies, and a term frequency variance, are acquired. The word feature database is obtained by the information retrieval system by collecting statistics of various features of each word that occurs in a certain quantity of files or in files obtained in a certain period of time. Therefore, according to each word included in the query, various statistical feature values corresponding to the word may be queried from the word feature database. The information retrieval system generally stores queries by using arrays, for example, Query1[6][n+2]={{backstreet, 1, statistical feature 1, statistical feature 2, . . . , statistical feature n}, {boys, 2, statistical feature 1, statistical feature 2, . . . , statistical feature n}, {', 3}, {the, 4, statistical feature 1, statistical feature 2, . . . , statistical feature n}, {one, 5, statistical feature 1, statistical feature 2, . . . , statistical feature n}, {', 6}}, where {backstreet, 1, statistical feature 1, statistical feature 2, . . . , statistical feature n} indicates that the first word in the query is "backstreet", and the statistical feature 1 to the statistical feature n are the statistical features of the word "backstreet". The statistical feature of each word in the first query reflects statistical information about each word in the first query, in the corpus of the information retrieval system, and analyzing the statistical feature of each word is also helpful for identifying a stop word.

After receiving the first query, the information retrieval system processes the first query and converts it into a data structure for storage, for example, in the foregoing Query1 [6][n+2]. In addition to acquiring the statistical feature of each word, optionally, the information retrieval system further acquires a first-query-based feature of each word in the first query, including a number of times that each word in the first query occurs in the first query, a part-of-speech of each word, a syntactic class of each word, a position of each word in the first query, whether each word is preceded and followed by a space, whether each word is placed within quotation marks, and the like. If there are m query-based features, after "backstreet boys 'the one'" is acquired, it is converted into Query1[6][n+m+2]. The first-query-based feature of each word in the first query reflects a feature of each word in the first query, and analyzing the query-based feature of each word is also helpful for identifying the stop word.

Step 606: Acquire, according to the session ID corresponding to the first query, a second query that belongs to a same session as the first query.

Historical queries are queried according to the session ID corresponding to the first query, and the second query that belongs to the same session as the query "backstreet boys 'the one'" is acquired. Herein, for example, the obtained second query is "the one backstreet boys", that is, Query2 [4][2]={{the, 1}, {one, 2}, {backstreet, 3}, {boys, 4}}. A statistical feature, a query-based feature, and the like of each word i in the Query2 are omitted. Because multiple queries may be included in the same session, optionally, the query acquired in step 606 may be a previous query before the query in step 602. In a query process, if a required file cannot be acquired by using a query, a user may adjust the query. Therefore, there is a high possibility that adjacent queries can form a query chain. Change-based features between the adjacent queries are also more helpful for identifying stop words. Each session ID and queries that belong to a session corresponding to the session ID are recorded in the historical queries. The historical queries may further include information about queries that belong to a same query chain.

It should be noted that step 604 and step 606 may be interchanged in an execution sequence or may be performed in parallel. The statistical features and query-based features of the words obtained in the query processing in step 604 in the query, and change-based features of the words that are acquired by performing step 606, step 608, and step 610 can all be used in step 612. Therefore, after step 602 is performed, step 604 and step 606 may be performed in parallel, where step 608 and step 610 may be further included after the branch of step 606.

Optionally, after step 606, step 608 is further performed.

Step 608: Determine whether the acquired second query meets any one of the following conditions: a length of a longest common clause of the first query and the second query is greater than a first threshold; or a minimum quantity of operations required for converting the first query into the second query is less than a second threshold; or the first query is mapped to a first vector, the first query is mapped to a second vector, and an included angle between the first vector and the second vector is less than a third threshold; or a ratio of a length of a longest common clause of the first query and the second query to a sum of lengths of the first query and the second query is greater than a fourth threshold; or a ratio of a length of a longest common clause of the first query and the second query to a length of a shorter one of the first query and the second query is greater than a fifth threshold; or a distance between the first vector and the second vector is less than a sixth threshold.

The session to which the first query belongs may include multiple queries. Therefore, the second query that meets the conditions may be further screened out from the multiple queries in step 608. That is, the second query that can form a query chain with the first query is screened out. A screening criterion may be based on any one of the following conditions or any combination thereof. Determining that the second query and the first query meet any one of the following conditions or any combination thereof is determining that the second query and the first query can form a query chain. If the second query and the first query can form a query chain, step 610 continues to be performed. If the second query and the first query cannot form a query chain, step 612 is performed.

Condition 1: Determine whether the length of the longest common clause of "backstreet boys 'the one'" and "the one backstreet boys" is greater than the first threshold. In this embodiment, the length of the longest common clause of "backstreet boys 'the one'" and "the one backstreet boys" is 2. If the first threshold is 1, "backstreet boys 'the one'" and "the one backstreet boys" can form a query chain. The length of the clause is a quantity of words included in the clause.

Elements in Query1[6][2]={{backstreet, 1}, {boys, 2}, {', 3}, {the, 4}, {one, 5}, {', 6}} are sequentially compared with elements in Query2[4][2]={{the, 1}, {one, 2}, {backstreet, 3}, {boys, 4}}, and the longest common clauses "backstreet boys" and "the one" of the Query1 and the Query2 are obtained. Lengths of the two clauses are both 2. Therefore, the lengths of the longest common clauses of the Query1 and Query2 are 2.

Condition 2: Determine the minimum quantity of operations required for converting "backstreet boys 'the one'" into "the one backstreet boys", or the minimum quantity of operations required for converting "the one backstreet boys" into "backstreet boys 'the one'". If the minimum quantity of operations required is less than the second threshold, it may be determined that "backstreet boys 'the one'" and "the one backstreet boys" belong to a same query chain. In this example, at least a total of six operations are required for converting "the one backstreet boys" into "backstreet boys 'the one'", that is, "the" and "one" at the beginning of the sentence need to be removed, then "the" and "one" need to be added at the end of the sentence, and quotation marks need to be added at both ends of "the one".

It can be known through comparison between the Query1 and the Query2 that the longest common clauses of the two are "backstreet boys" and "the one". Therefore, to convert "the one backstreet boys" into "backstreet boys 'the one'", at least six operations are required, that is, removing {the, 1} and {one, 2} from the Query1 so that {backstreet, 3} and {boys, 4} are changed to {backstreet, 1} and {boys, 2}, then adding {the, 4} and {one, 5} after {boys, 2}, and adding quotation marks {', 3} and {', 6} at both ends of the new {the, 1} and {one, 2}.

Condition 3: Calculate an included angle between vectors converted from "backstreet boys 'the one'" and "the one backstreet boys". If the included angle is less than the third threshold, "backstreet boys 'the one'" and "the one backstreet boys" can form a query chain. A common method for converting a query into a vector includes: 1. establishing a vector space model (VSM), and using each word in the word feature database as a dimension, where a quantity of dimensions in the VSM is equal to a quantity of words in the word feature database, and mapping "the one backstreet boys" to the VSM, where values are assigned to dimensions corresponding to the four words "the", "one", "backstreet", and "boys" in the VSM, the values may represent occurrences of the words or statistical features of the words, and through the establishment of the VSM, "backstreet boys 'the one'" and "the one backstreet boys" become two vectors in a VSM space, so that an included angle or a distance between the two vectors may be calculated; 2. methods for converting a sentence into a vector, such as Word2vec, bags of words, and word embedding.

Condition 4: A difference from the condition 1 lies in that a magnitude relationship between the ratio of the length of the longest common clause of "backstreet boys 'the one'" and "the one backstreet boys" to the sum of the lengths of "backstreet boys 'the one'" and "the one backstreet boys" and the fourth threshold is determined. If the ratio is greater than the fourth threshold, it may be determined that "backstreet boys 'the one'" and "the one backstreet boys" belong to a same query chain. The length of a query is a quantity of words included in the query.

Condition 5: A difference from the condition 1 lies in that a magnitude relationship between the ratio of the length of the longest common clause of "backstreet boys 'the one'" and "the one backstreet boys" to the length of the shorter one of "backstreet boys 'the one'" and "the one backstreet boys" and the fifth threshold is determined. If the ratio is greater than the fifth threshold, it may be determined that "backstreet boys 'the one'" and "the one backstreet boys" belong to a same query chain.

Condition 6: Differences from the condition 3 are as follows: After "backstreet boys 'the one'" and "the one backstreet boys" are converted into vectors, a distance between the two vectors is calculated. If the distance is less than the sixth threshold, "backstreet boys 'the one'" and "the one backstreet boys" can form a query chain. The distance between the two vectors in the condition 6 may be a Euclidean distance.

It should be noted that a parameter is generated for each of the six conditions. The parameters are the length of the longest common clause, the minimum quantity of operations, the included angle between the vectors, the ratio of the length of the longest common clause to the sum of the lengths of the two queries, the ratio of the length of the longest common clause to the length of the shorter query, and the distance between the vectors. Therefore, during actual use in step 608, any two or more of the six parameters may be combined randomly for use. For example, after weights are assigned to the six parameters, summation is performed to acquire a total parameter, and comparison is made between the total parameter and a threshold to determine whether the two queries can form a query chain.

In the process of using the information retrieval system, the user may change a retrieval target, and there are generally great changes in used queries when the user retrieves different targets, and therefore, a better effect is achieved if the stop word is identified according to change-based features between two queries with a same or similar retrieval target. Therefore, the six conditions are essentially used to determine that there are few differences between the first query and the second query, so that the first query and the second query with the same or similar retrieval target are obtained.

In step 608, if it is determined that the two queries can form a query chain, a determining result in step 608 may be stored in the historical queries. For example, a storage format is query chain 1: query A and query B; query chain 2: query C and query D. In this way, if the information retrieval system receives a same query again, the determining process in the foregoing step 608 does not need to be performed, and a historical determining result is read directly. In addition, the query chain 2 includes only the query C and query D. If a query E is received and it is determined that the query E and the query D belong to the same query chain, a query chain 3: query D and query E may be created, or a query chain 4: query C, query D, and query E may be created, and certainly, the query chain 2 may be replaced with the query chain 4. In this way, query chain information stored in the information retrieval system is richer, and subsequently extracted change-based features between queries are also richer.

Step 610: Acquire a change-based feature of each word in the first query relative to the second query. The change-based feature of each word in the first query relative to the second query indicates various changes of each word in the first query relative to the second query.

Optionally, the change-based feature of each word in the first query relative to the second query includes any one of the following: a first change-based feature, used to indicate whether each word in the first query relative to the second query is a new word; a second change-based feature, used to indicate a change of a position of a word, included in both the first query and the second query, in the first query relative to a position of the word in the second query; a third change-based feature, used to indicate a change of a part-of-speech of a word, included in both the first query and the second query, in the first query relative to a part-of-speech of the word in the second query; a fourth change-based feature, used to indicate a change of a syntactic class of a word, included in both the first query and the second query, in the first query relative to a syntactic class of the word in the second query; or a fifth change-based feature, used to indicate a change of punctuation marks at both ends of a word, included in both the first query and the second query, in the first query relative to punctuation marks at both ends of the word in the second query.

The first change-based feature is used to indicate whether each word in the first query relative to the second query is a new word. Generally, it is less possible that a new word in the first query relative to the second query is a stop word. For example, if the second query is "backstreet boys", and the first query is "backstreet boys the one", "the one" is a new word in the first query relative to the second query.

For example, the first query is Query $A[m][n]=\{\{word_{11}, m_{11}, m_{12}, \ldots, m_{1n}\}, \{word_{12}, m_{21}, m_{22}, \ldots, m_{2n}\} \ldots \{word_{1m}, m_{m1}, m_{m2}, \ldots, m_{mn}\}\}$, and the second query is Query $B[x][y]=\{\{word_{21}, m_{11}, m_{12}, \ldots, m_{1y}\}, \{word_{22}, m_{21}, m_{22}, \ldots, m_{2y}\} \ldots \{word_{2x}, m_{x1}, m_{x2}, \ldots, m_{xy}\}\}$. The $word_{11}$ in the Query A is a word or a punctuation mark, $m_{11}$ is a position of the word in A, $m_{12}$ is a syntactic class of the word in A, $m_{13}$ is a part-of-speech of the word, and $m_{14}$ to min indicate other statistical features of the $word_{11}$ or query-based features of the $word_{11}$ in the first query.

Through comparison between the Query A and the Query B, whether each word in the Query A relative to the Query B is new may be determined, and therefore, whether each word in the first query relative to the second query is a new word may be determined.

The second change-based feature is used to indicate the change of the position of each word in the first query, in the first query relative to the position of the word in the second query. Generally, if there is a change of a position of a word in the first query relative to a position of the word in the second query, it indicates that the word is relatively important, that is, there is a low possibility that the word is a stop word.

Corresponding elements in each row in the Query A and the Query B are compared. For example, if the $word_{11}$ and the $word_{22}$ are the same (the $word_{11}$ is a word), but $m_{11}$ and $m_{21}$ are different, it indicates that the position of the word corresponding to the $word_{11}$ in the first query relative to the position of the word in the second query is changed. Therefore, the second feature may indicate whether the position is changed, or may indicate a change magnitude, namely, a difference between $m_{11}$ and $m_{21}$.

The third change-based feature indicates a change of a part-of-speech of a word, included in both the first query and the second query, in the first query relative to a part-of-speech of the word in the second query. For words of different parts-of-speech, possibilities of being stop words vary. For example, generally, a probability of a noun being a stop word is lower than a probability of an adjective being a stop word. If different feature values are assigned to different parts-of-speech, if a part-of-speech of a word in the first query relative to a part-of-speech of the word in the second query is changed, the third change-based feature may be a feature value of the part-of-speech of the word in the first query minus a feature value of the part-of-speech of the word in the second query.

Corresponding elements in each row in the Query A and the Query B are compared. For example, if the $word_{11}$ and $word_{22}$ are the same (the $word_{11}$ is a word), but $m_{13}$ and $m_{23}$ are different, it indicates that the part-of-speech of the word corresponding to the $word_{11}$ in the first query relative to the part-of-speech of the word in the second query is changed.

The fourth change-based feature indicates a change of a syntactic class of a word, included in both the first query and the second query, in the first query relative to a syntactic class of the word in the second query. For words of different syntactic classes, possibilities of being stop words vary. If different feature values are assigned to different syntactic classes, for example, a subject, a predicate, and an object, if a syntactic class of a word in the first query relative to a syntactic class of the word in the second query is changed, the fifth change-based feature may be a feature value of the syntactic class of the word in the first query minus a feature value of the syntactic class of the word in the second query.

Corresponding elements in each row in the Query A and the Query B are compared. For example, if the $word_{11}$ and $word_{22}$ are the same (the $word_{11}$ is a word), but $m_{12}$ and $m_{22}$ are different, it indicates that the syntactic class of the word corresponding to the $word_{11}$ in the first query relative to the syntactic class of the word in the second query is changed.

The fifth change-based feature indicates a change of punctuation marks at both ends of a word, included in both the first query and the second query, in the first query relative to punctuation marks at both ends of the word in the second query. If punctuation marks at both ends of a word are different, a possibility of the word being a stop word varies. For example, relative to a word in the second query, if there are additional spaces at both ends of the word in the first query, or the word is placed within double quotation marks or single quotation marks, it indicates that a possibility of the word being a stop word is low, and the sixth change-based feature may further indicate that the possibility of the substitute word being a stop word is low. For example, if the second query is "backstreet boys the one", and the first query is "backstreet boys 'the one'", there are quotation marks at both ends of "the one" in the first query, and a possibility of the word "the one" being a stop word is low.

Corresponding elements in each row in the Query A and the Query B are compared. For example, if the $word_{13}$ and $word_{23}$ are the same (the $word_{13}$ is a word), but a punctuation mark $word_{12}$ located before the $word_{13}$ and a punctuation mark $word_{14}$ located after the $word_{13}$ are different from a punctuation mark $word_{22}$ located before the $word_{23}$ and a punctuation mark $word_{24}$ located after the $word_{23}$, it indicates that punctuation marks at both ends of the $word_{13}$ relative to the $word_{23}$ are changed, or the $word_{22}$ and $word_{24}$ may not be punctuation marks, which indicates that punctuation marks are added at both ends of the $word_{13}$ in the first query.

If it is determined in step 608 that "backstreet boys 'the one'" and "the one backstreet boys" can form a query chain, the change-based features of "backstreet boys 'the one'" relative to "the one backstreet boys" are acquired.

Using the first query "backstreet boys 'the one'" and the second query "backstreet boys the one" as an example, "the" and "one" in the first query have two change-based features relative to the second query, which are the foregoing second change-based feature and the foregoing fifth change-based feature, that is, positions of "the" and "one" are changed and quotation marks are added at both ends of "the one".

It should be noted that, in the session to which "backstreet boys 'the one'" belongs, if there is a similar query chain including two additional queries, similar to the query chain 4 in step 608, not only the change-based features of "backstreet boys 'the one'" relative to "the one backstreet boys" may be acquired, but also change-based features of "backstreet boys 'the one'" relative to the other queries may be acquired in step 610. In addition, the acquired change-based features and the query chain determining result acquired in step 608 are stored in the historical queries, for processing a same query at a next time.

In addition to storing a query in the foregoing array manner, an object-oriented programming implementation manner may be used for implementation. For example, we can use the following classes to indicate two objects, Query and Word, where the Query class indicates a query, and the Word class indicates each word in the query.

```
Query
{
//attribute information
String sessionID;
String queryContent;
Word wordList[ ];
...
//function definition
static public isInTheSameSession( ){ };
static public isInTheSameQueryChain( ){ };
...
}
Word
{
//attribute information, including content of a word, a statistical feature, and a query-based feature of the word in the query
String wordContent;
int wordPosition;
int wordFrequency;
long wordVariance;
...
//dynamic information
Boolean newWord;
Int positionChange;
Long posChange;
...
//function definition
static public Boolean newWord( ){ };
static public Int positionChange ( ){ };
...
}
```

After each query and word are stored by using the foregoing data structure, to determine whether a Query M and a Query N belong to a same session, the following may be invoked: Query.isInTheSameSession( )

{Query M. sessionID, Query N. sessionID}, where isInTheSameSession( ){ } is defined as determining, according to a session ID of an input query, whether two queries belong to a same session.

To determine whether the Query M and the Query N belong to the same query chain, the following may be invoked: Query.isInTheSameQueryChain( ){Query M. sessionID, Query N. sessionID}, where Query.isInTheSameQueryChain( ){ } is defined as determining, according to the input query, whether two queries belong to the same query chain, that is, the isInTheSameQueryChain( ){ } includes the method for determining whether the first query and the second query belong to a same query chain in step 608.

Similarly, the foregoing first change-based feature may be implemented by using a Word.newWord( ) function. After knowing that the Query1 and the Query2 belong to the same query chain, we can run the newWord( ) function for each word in the Query1. Word, to determine whether each word in the first query relative to the second query is a new word. Acquisition of other change-based features is similar to the foregoing. Various change-based features of each word in the Query1 relative to the Query2 may be obtained according to each function defined in the Query1. Word.

Step 612: Identify a stop word in the first query according to the change-based feature of each word in the first query relative to the second query.

Multiple methods may be used to identify the stop word in the first query. Exemplarily, values are assigned to various change-based features of each word in the first query. If the value of each change-based feature is higher, it indicates a higher possibility of the word being a stop word. If a weighted sum of values of various change-based features of any word in the first query is greater than a preset threshold, the word is identified as a stop word. If the weighted sum is not greater than the preset threshold, the word is identified as a non stop word.

Optionally, after step 602, step 604 is further included, that is, the statistical feature of each word in the first query is acquired. Therefore, in step 612, the stop word in the first query may be identified according to the statistical feature of each word in the first query and the change-based feature of each word in the first query relative to the second query.

Optionally, if the first-query-based feature of each word in the first query is further acquired in step 604, the stop word in the first query may be identified in step 612 according to the statistical feature of each word in the first query, the first-query-based feature of each word in the first query, and the change-based feature of each word in the first query relative to the second query, so that stop word identification precision is further improved.

Optionally, the information retrieval system is further provided with an identification model, and the statistical feature of each word in the first query and various change-based features of each word in the first query relative to the second query are input to the identification model, so that whether each word in the first query is a stop word is determined The identification model may be a threshold model. For example, if a weighted sum of values of various change-based features and statistical features of a word is greater than a preset threshold, the word is identified as a stop word. If the weighted sum is not greater than the preset threshold, the word is identified as a non stop word. The identification model may also be a learning model, such as a decision tree or a neural network. During actual use, in addition to using the foregoing identification model, we may further configure some direct identification standards that are used with an identification method to accelerate an identification process. For example, if a word in the first query relative to the second query is a new word, the word may be directly identified as a non stop word.

If step 604 is further included after step 602, if the first query and any historical query cannot form a query chain, the change-based features of the first query relative to the second query cannot be obtained, and therefore, in step 612, the stop word in the first query is identified according to only the statistical feature of each word in the first query.

The conventional method for stop word identification based on a stop word list depends on only a manually set stop word list or statistical information of files, and cannot use change-based features between queries belonging to a same session in a stop word identification process. For example, in the query "backstreet boys 'the one'", if a stop word list is used to identify whether each word is a stop word, the definite article "the" can be easily identified as a stop word. However, in this example, "the one" is a title of a song of the band "backstreet boys", and therefore, "the" cannot be simply considered as a definite article for processing. If "the" is considered as a stop word, and a meaning represented by "the" is ignored in a subsequent search process, an adverse impact is caused on a search result. In the method provided by this embodiment, change-based features between queries are used in the stop word identification process, so that the information retrieval system can better perform stop word identification according to a change of a query input by the user, thereby avoiding an error caused by inability to use a query change that arises from a query adjustment made by the user in a stop word identification process in the conventional method for stop word identification based on a stop word list.

Optionally, step 614 is further included, where a statistical feature of the stop word in the first query and a change-based feature of the stop word in the first query relative to the second query are used as a positive sample, a statistical feature of any word except the stop word in the first query and a change-based feature of any word except the stop word in the first query relative to the second query are used as a negative sample, and the identification model is trained according to the positive sample and the negative sample.

After the stop word in the first query is identified, the statistical feature of the stop word in the first query and the change-based feature of the stop word in the first query relative to the second query are used as a positive sample, the statistical feature of any word except the stop word in the first query and the change-based feature of any word except the stop word in the first query relative to the second query are used as a negative sample to train the identification model. When stop word identification is performed in the identification model subsequently, if a received word is categorized as a positive sample, it indicates that the identification model identifies the word as a stop word; if a received word is categorized as a negative sample, it indicates that the identification model does not identify the word as a stop word. Training the identification model improves precision of the identification model.

Optionally, if the stop word in the first query is identified according to the statistical feature of each word in the first query, the first-query-based feature of each word in the first query, and the change-based feature of each word in the first query relative to the second query in step 612, in step 614, a first-query-based feature of the stop word in the first query is used as a positive sample, and a first-query-based feature of any word except the stop word in the first query is used as a negative sample to train the identification model, so that precision of the identification model is further improved.

After a stop word in a query is identified every time, the information retrieval system may store a positive sample and a negative sample that are acquired, so that after positive samples and negative samples are accumulated in a certain period of time or a certain quantity of positive samples and negative samples are accumulated, step 614 is performed.

Optionally, before step 614, the stop word identified by the identification model is further removed from the first query to obtain a candidate search term, and a search is performed according to the candidate search term to obtain a search result; and the training is performed if accuracy of the search result is determined.

The search is performed according to the candidate search term, and related features in the search process and the search result are stored in a historical query log. The related features in the search process include the statistical feature of each word in the first query, the change-based feature of each word in the first query relative to the second query, and the first-query-based feature of each word in the first query. In addition, after step 614, as far as the user is concerned, the search result based on "backstreet boys 'the one'" may be already obtained. The search result includes file IDs retrieved according to the query. For a storage format of the historical query log, reference may be made to Table 2. After acquiring each file ID, the information retrieval system returns files corresponding to the file IDs to the user. Information about operations performed on these files by the user is also recorded in the historical query log. The operation information includes information about operations performed on each file after the user obtains each file that is queried, for example, which files are clicked by the user, the time when a click action occurs, and duration of browse in each file. An interval between the time at which a file is clicked and the time at which a next file is clicked is generally considered as duration of browse in a previous file.

TABLE 2

| Query 1 | Related feature in the search process | Search result | Operation information |
|---|---|---|---|
| Query 2 | Related feature in the search process | Search result | Operation information |
| ... | ... | ... | ... |
| Query n | Related feature in the search process | Search result | Operation information |

To determine accuracy of the search result corresponding to the first query is to perform analysis on the operation information corresponding to the first query, so as to determine user satisfaction with the search result corresponding to the first query. For example, if it is found in the search result of the first query that the user does not click other files within 60 seconds after the user clicks a file, it may be considered that the user finds a required file in this search result; therefore, the word that is identified as a stop word in the first query and related features in the search process corresponding to the word may be used as a positive sample of the identification model, and words that are not identified as stop words in the first query and related features in the search process corresponding to the words may be used as negative samples for the identification model to train the identification model.

Multiple screening conditions may be set for determining accuracy of the search result corresponding to the first query. In addition to the screening condition that no-action duration after the user clicks a file exceeds a threshold, whether a quantity of files clicked by the user in the files retrieved at this time exceeds a threshold, or the like may be determined, so long as the setting of the screening condition or event can represent that the user accepts accuracy of the file in this search result.

The identification model generally needs to be trained after certain quantities of positive samples and negative samples are accumulated. Therefore, after a certain quantity of queries are accumulated in the historical query logs or after a preset period of time elapses, analysis is performed on operation information of the search result corresponding to each query in the historical query logs to mine the related features that are suitable for being used as training data of the identification model, in the search process corresponding to the query, and train the identification model.

In the process of using the information retrieval system, operations performed on each file in the search result by the user reflect the user's determining of accuracy of this search result, and also reflect whether the stop word identification result corresponding to the search result is accurate. Through analysis of the historical query log corresponding to each query of the user, search results of which queries are satisfactory to the user may be known, and therefore, related parameters and results of stop word identification corresponding to this part of queries may be used to train the identification model. The operation results of the user are fed back to the identification model used in the stop word identification process, so that adaptability of the information retrieval system to the use environment, habit, and the like of the user is improved. In particular, this is useful for stop word identification in the information retrieval system in some special use scenarios. For example, in an information retrieval system used in a supermarket, the word "merchandise" is used more frequently and probably does not indicate any special meaning; therefore, when the information retrieval system uses "merchandise" as a stop word and performs a search, the user may comparatively accept accuracy of a search result. Therefore, related features in the search process of the word "merchandise" may be used as a positive sample to train the identification model.

Step 616: Update the word feature database of the information retrieval system according to new files.

The files that can be retrieved by the information retrieval system are updated periodically. Therefore, after analysis is performed on each word in the new files, the word feature database may be updated, so that stop word identification accuracy of the information retrieval system is improved. Step 616 may be performed independently of step 602 to step 614, that is, the updating of the word feature database and the training of the identification model may be performed in parallel. Step 614 and step 616 may be performed online (performed when the user inputs a query), or may be performed offline (for example, when the system is idle, or during centralized maintenance of the system, or during updating of the system). In particular, because execution of both step 614 and step 616 requires accumulation of historical query log updates or accumulation of file updates in a certain period of time, processing pressure caused by online execution to the information retrieval system may be avoided if step 614 and step 616 are executed offline.

In the stop word identification method provided by this embodiment, a query that belongs to a same session as a to-be-processed query is acquired, then change-based features of words in the to-be-processed query relative to the query are acquired, and the change-based features are incorporated into considerations for identifying a stop word in the to-be-processed query. Therefore, in the stop word identification process, stop word identification can be performed according to the change-based features between the queries, and stop word identification precision is improved, that is, accuracy of a search result output by an information retrieval system is improved.

An embodiment of the present invention further provides a stop word identification apparatus 800. The stop word identification apparatus 800 may be implemented by the retrieval device 202 shown in FIG. 1 or FIG. 2, or may be implemented by the computing device 400 shown in FIG. 3, or may be implemented by an application-specific integrated circuit (ASIC), or may be implemented by a programmable logic device (PLD). The PLD may be a complex programmable logic device (CPLD), an FPGA, generic array logic (GAL), or any combination thereof. The stop word identification apparatus 800 is configured to implement the stop word identification method shown in FIG. 4.

Figure 5:
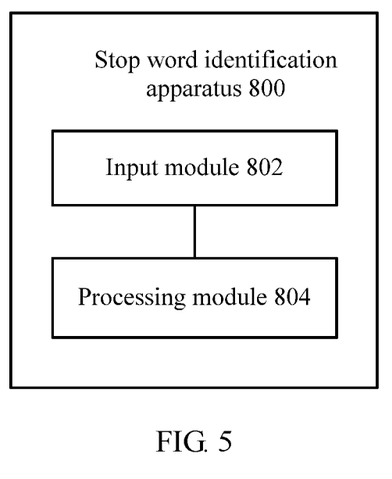
FIG. 5 is a schematic diagram of an organizational structure of a stop word identification apparatus according to an embodiment of the present invention.

A schematic diagram of an organizational structure of the stop word identification apparatus 800 is shown in FIG. 5. The apparatus includes an input module 802 and a processing module 804. When working, the processing module 804 performs step 604 to step 616 in the stop word identification method shown in FIG. 4.

The input module 802 is configured to receive a first query, and acquire a session ID corresponding to the first query, that is, perform step in the stop word identification method shown in FIG. 4.

The processing module 804 is configured to acquire, according to the session ID corresponding to the first query, a second query that belongs to a same session as the first query; further configured to acquire a change-based feature of each word in the first query relative to the second query; and further configured to identify a stop word in the first query according to the change-based feature of each word in the first query relative to the second query.

The second query acquired by the processing module 804 and the first query can form a query chain. A condition for determining formation of a query chain includes: a length of a longest common clause of the first query and the second query is greater than a first threshold; or a minimum quantity of operations required for converting the first query into the second query is less than a second threshold; or the first query is mapped to a first vector, the first query is mapped to a second vector, and an included angle between the first vector and the second vector is less than a third threshold; or a ratio of a length of a longest common clause of the first query and the second query to a sum of lengths of the first query and the second query is greater than a fourth threshold; or a ratio of a length of a longest common clause of the first query and the second query to a length of a shorter one of the first query and the second query is greater than a fifth threshold; or a distance between a first vector and a second vector is less than a sixth threshold.

The processing unit 804 further queries a word feature database of an information retrieval system according to each word in the first query, and acquires a statistical feature of each word in the first query; and inputs the change-based feature of each word in the first query relative to the second query and the statistical feature of each word in the first query to an identification model, and obtains the stop word identified by the identification model, in the first query. The identification model is generally a segment of program code. The processing unit 804 invokes this segment of program code when training the identification model or when using the identification model to identify a stop word.

The processing unit 804 further removes the stop word identified by the identification model from the first query to obtain a candidate search term, and performs a search according to the candidate search term to obtain a search result; and if accuracy of the search result is determined, uses a statistical feature of the stop word in the first query and a change-based feature of the stop word in the first query relative to the second query as a positive sample, uses a statistical feature of any word except the stop word in the first query and a change-based feature of any word except the stop word in the first query relative to the second query as a negative sample, and trains the identification model according to the positive sample and the negative sample. To determine accuracy of the search result corresponding to the first query is to perform analysis on operation information corresponding to the first query, so as to determine user satisfaction with the search result corresponding to the first query. Various features of stop words and non stop words identified during stop word identification of the query corresponding to the search result that is satisfactory to the user are used to train the identification model, so that precision of the identification model is further improved.

The stop word identification apparatus provided by this embodiment can acquire a query that belongs to a same session as a to-be-processed query, then acquire change-based features of words in the to-be-processed query relative to the query, and incorporate the change-based features into considerations for identifying a stop word in the to-be-processed query. Therefore, in the stop word identification process, stop word identification can be performed according to the change-based features between the queries, and stop word identification precision is improved, that is, accuracy of a search result output by an information retrieval system is improved.

In the foregoing embodiments, the description of each embodiment has respective focuses. For a part that is not described in detail in a certain embodiment, reference may be made to related descriptions in other embodiments.

The method described with reference to content disclosed by the present invention may be implemented by a processor by executing a software instruction. The software instruction may include corresponding software modules. The software modules may be stored in a RAM, a flash memory, a ROM, an erasable programmable read only memory (EPROM), an electrically erasable programmable read only memory (EEPROM), a hard disk, an optical disk, or a storage medium in any other form known in the art.

A person skilled in the art may be aware that, in one or more foregoing examples, the functions described in the present invention may be implemented by hardware or software. When implemented by software, the functions may be stored in a computer-readable medium or transmitted as one or more instructions or code in the computer-readable medium. The storage medium may be any general or dedicated available medium accessible to a computer.

In the foregoing specific implementation manners, the objectives, technical solutions, and benefits of the present invention are further described in detail. It should be understood that the foregoing descriptions are merely specific implementation manners of the present invention, but are not intended to limit the protection scope of present invention. Any modification or improvement made on the basis of the technical solutions of the present invention shall fall within the protection scope of the present invention.

What is claimed is:

1. A stop word identification method, wherein the method is executed by an information retrieval system running on a computing device and comprises:

receiving a first query comprising a plurality of words;

acquiring a session identifier (ID) corresponding to the first query;

acquiring, according to the session ID, a second query that belongs to a same session as the first query;

determining that the first query and the second query forms a query chain, wherein the second query meets at least one of the following conditions to form the query chain with the first query: a length of a longest common clause of the first query and the second query is greater than a first threshold; or a minimum quantity of operations required for converting the first query into the second query is less than a second threshold; or the first query is mapped to a first vector, the second query is mapped to a second vector, and an included angle or a distance between the first vector and the second vector is less than a third threshold; and based on the determination:
 acquiring a change-based feature of each word in the first query relative to the second query; and
 identifying a stop word in the first query according to the change-based feature of said each word in the first query relative to the second query.

2. The method according to claim 1, wherein the change-based feature of said each word in the first query relative to the second query comprises:
    a first change-based feature, used to indicate whether said each word in the first query relative to the second query is a new word;
    a second change-based feature, used to indicate a change of a position of said each word in the first query relative to a position of said each word in the second query;
    a third change-based feature, used to indicate a change of a part-of-speech of said each word in the first query relative to a part-of-speech of said each word in the second query;
    a fourth change-based feature, used to indicate a change of a syntactic class of said each word in the first query relative to a syntactic class of said each word in the second query; or
    a fifth change-based feature, used to indicate a change of punctuation marks at both ends of said each word in the first query relative to punctuation marks at both ends of said each word in the second query.

3. The method according to claim 1, wherein the method further comprises:
    querying a word feature database of the information retrieval system according to said each word in the first query;
    acquiring a statistical feature of said each word in the first query; and
    the identifying a stop word in the first query according to the change-based feature of said each word in the first query relative to the second query comprises:
    identifying the stop word in the first query according to the statistical feature of said each word in the first query and the change-based feature of said each word in the first query relative to the second query.

4. The method according to claim 3, further comprising:
    wherein the information retrieval system further comprises an identification model; and
    wherein the identifying the stop word in the first query according to the statistical feature of said each word in the first query and the change-based feature of said each word in the first query relative to the second query comprises:
        inputting the change-based feature of said each word in the first query relative to the second query and the statistical feature of said each word in the first query to the identification model; and
        obtaining the stop word identified by the identification model, in the first query.

5. The method according to claim 4, wherein the method further comprises:
    using a statistical feature of the stop word in the first query and a change-based feature of the stop word in the first query relative to the second query as a positive sample;
    using a statistical feature of a word except the stop word in the first query and a change-based feature of the word in the first query relative to the second query as a negative sample; and
    training the identification model according to the positive sample and the negative sample.

6. The method according to claim 5, wherein before performing the training, the method further comprises:
    removing the stop word identified by the identification model from the first query to obtain a candidate search term;
    performing a search according to the candidate search term to obtain a search result; and
    determining accuracy of the search result.

7. A computing device comprising:
    a memory storage comprising instructions; and
    a processor in communication with the memory, wherein the processor executes the instructions to:
        receive a first query comprising a plurality of words, acquiring a session identifier ID corresponding to the first query;
        acquire, according to the session (ID), a second query that belongs to a same session as the first query;
        determine that the first query and the second query forms a query chain, wherein the second query meets at least one of the following conditions to form the query chain with the first query: a length of a longest common clause of the first query and the second query is greater than a first threshold; or a minimum quantity of operations required for converting the first query into the second query is less than a second threshold; or the first query is mapped to a first vector, the second query is mapped to a second vector, and an included angle or a distance between the first vector and the second vector is less than a third threshold; and
    based on the determination:
        acquire a change-based feature of each word in the first query relative to the second query; and
        identify a stop word in the first query according to the change-based feature of said each word in the first query relative to the second query.

8. The computing device according to claim 7, wherein the change-based feature of said each word in the first query relative to the second query comprises one of the following:
    a first change-based feature, used to indicate whether said each word in the first query relative to the second query is a new word;
    a second change-based feature, used to indicate a change of a position of said each word in the first query relative to a position of said each word in the second query;
    a third change-based feature, used to indicate a change of a part-of-speech of said each word in the first query relative to a part-of-speech of said each word in the second query;
    a fourth change-based feature, used to indicate a change of a syntactic class of said each word in the first query relative to a syntactic class of said each word in the second query; or
    a fifth change-based feature, used to indicate a change of punctuation marks at both ends of said each word in the first query relative to punctuation marks at both ends of said each word in the second query.

9. The computing device according to claim 7, wherein the processor executes the instructions to:
    query a word feature database of an information retrieval system according to said each word in the first query;
    acquire a statistical feature of said each word in the first query; and
    identifying the stop word in the first query according to the statistical feature of said each word in the first query and the change-based feature of said each word in the first query relative to the second query.

10. The computing device according to claim 9, wherein that the processor executes the instructions to:
    input the change-based feature of said each word in the first query relative to the second query and the statistical feature of said each word in the first query to an identification model; and
    obtain the stop word identified by the identification model, in the first query.

11. The computing device according to claim 10, wherein the processor executes the instructions to:
use a statistical feature of the stop word in the first query and a change-based feature of the stop word in the first query relative to the second query as a positive sample;
use a statistical feature of a word except the stop word in the first query and a change-based feature of the word in the first query relative to the second query as a negative sample; and
train the identification model according to the positive sample and the negative sample.

12. The computing device according to claim 11, wherein the processor executes the instructions to:
before the training, remove the stop word identified by the identification model from the first query to obtain a candidate search term; and
perform a search according to the candidate search term to obtain a search result; and
determining accuracy of the search result.

13. A storage medium storing computer executable instructions that when executed by a processor instruct the processor to:
receive a first query comprising a plurality of words;
acquire a session identifier (ID) corresponding to the first query;
acquire, according to the session ID, a second query that belongs to a same session as the first query;
determine that the first query and the second query forms a query chain, wherein the second query meets at least one of the following conditions to form the query chain with the first query: a length of a longest common clause of the first query and the second query is greater than a first threshold; or a minimum quantity of operations required for converting the first query into the second query is less than a second threshold; or the first query is mapped to a first vector, the second query is mapped to a second vector, and an included angle or a distance between the first vector and the second vector is less than a third threshold; and
based on the determination:
acquire a change-based feature of each word in the first query relative to the second query; and
identify a stop word in the first query according to the change-based feature of said each word in the first query relative to the second query.

14. The storage medium according to claim 13, wherein the change-based feature of said each word in the first query relative to the second query comprises one of the following:
a first change-based feature, used to indicate whether said each word in the first query relative to the second query is a new word;
a second change-based feature, used to indicate a change of a position of said each word in the first query relative to a position of said each word in the second query;
a third change-based feature, used to indicate a change of a part-of-speech of said each word in the first query relative to a part-of-speech of said each word in the second query;
a fourth change-based feature, used to indicate a change of a syntactic class of said each word in the first query relative to a syntactic class of said each word in the second query; or
a fifth change-based feature, used to indicate a change of punctuation marks at both ends of said each word in the first query relative to punctuation marks at both ends of said each word in the second query.

15. The storage medium according to claim 13, wherein the processor is instructed to:
query a word feature database of the information retrieval system according to said each word in the first query; and
acquire a statistical feature of said each word in the first query; and
identify the stop word in the first query according to the statistical feature of said each word in the first query and the change-based feature of said each word in the first query relative to the second query.

16. The storage medium according to claim 15, wherein the information retrieval system further comprises an identification model; and
wherein the processor is instructed to:
input the change-based feature of said each word in the first query relative to the second query and the statistical feature of said each word in the first query to the identification model; and
obtain the stop word identified by the identification model, in the first query.

17. The storage medium according to claim 16, wherein the processor is instructed to:
use a statistical feature of the stop word in the first query and a change-based feature of the stop word in the first query relative to the second query as a positive sample;
use a statistical feature of a word except the stop word in the first query and a change-based feature of the word in the first query relative to the second query as a negative sample; and
train the identification model according to the positive sample and the negative sample.

18. The storage medium according to claim 17, wherein the processor is instructed to:
remove the stop word identified by the identification model from the first query to obtain a candidate search term;
perform a search according to the candidate search term to obtain a search result; and
determine accuracy of the search result.

* * * * *